United States Patent [19]
Hall et al.

[11] 3,894,593
[45] July 15, 1975

[54] WEIGHING SCALE

[75] Inventors: Donivan L. Hall; Walter E. Kupper, both of Toledo, Ohio

[73] Assignee: Reliance Electric Company, Toledo, Ohio

[22] Filed: May 15, 1974

[21] Appl. No.: 470,148

Related U.S. Application Data

[62] Division of Ser. No. 407,659, Oct. 18, 1973, Pat. No. 3,847,238.

[52] U.S. Cl. .............................................. 177/164
[51] Int. Cl. ............................................ G01g 23/14
[58] Field of Search ................... 177/164, 210, 255

[56] References Cited
UNITED STATES PATENTS

| | | | |
|---|---|---|---|
| 3,142,349 | 7/1964 | Blodgett | 277/164 |
| 3,807,517 | 4/1974 | Freeman | 177/164 X |

*Primary Examiner*—George H. Miller, Jr.
*Attorney, Agent, or Firm*—Thomas H. Grafton

[57] ABSTRACT

A weighing scale with improved parallel guidance mechanism including five two-force members which constrain two linear degrees of freedom and the three angular degrees of freedom of the scale's weigh platter. The five two-force members are check links so arranged in space that five of the six possible degrees of freedom of a body in space, i.e., the weight platter, are constrained leaving the sixth degree of freedom for use in force measurement. The scale also features novel adjustment means for ensuring that a given load weighs the same in all locations on the platter.

4 Claims, 7 Drawing Figures

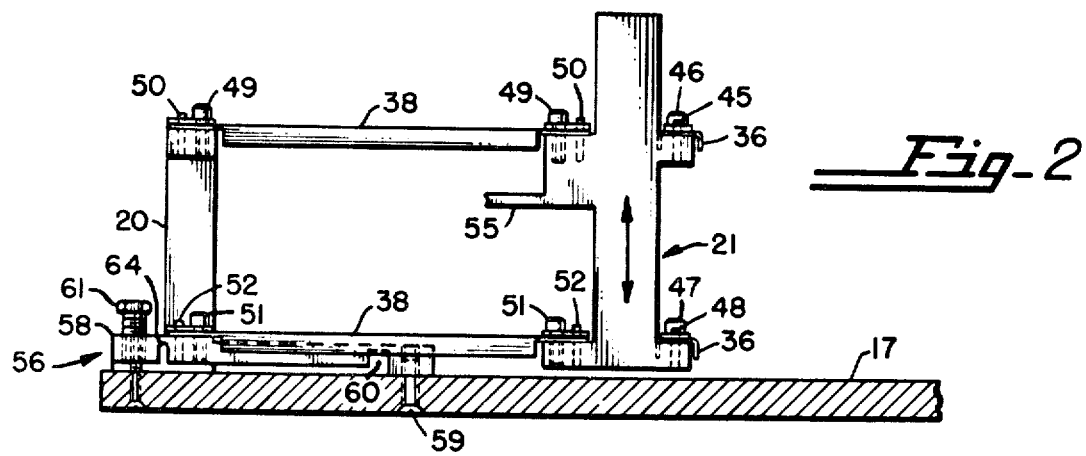
Fig-2
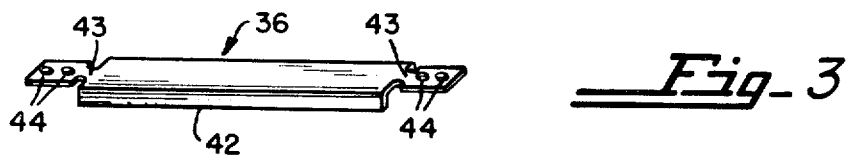
Fig-3
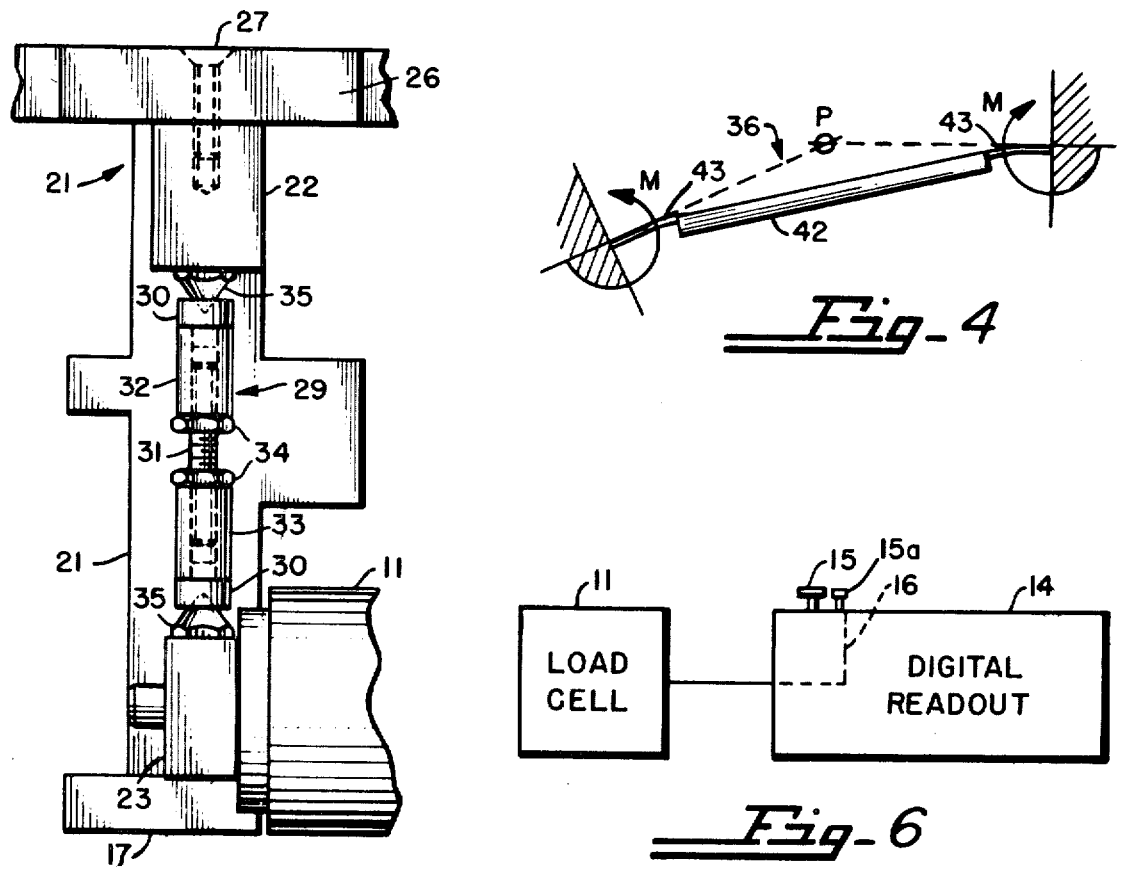
Fig-4
Fig-5
Fig-6

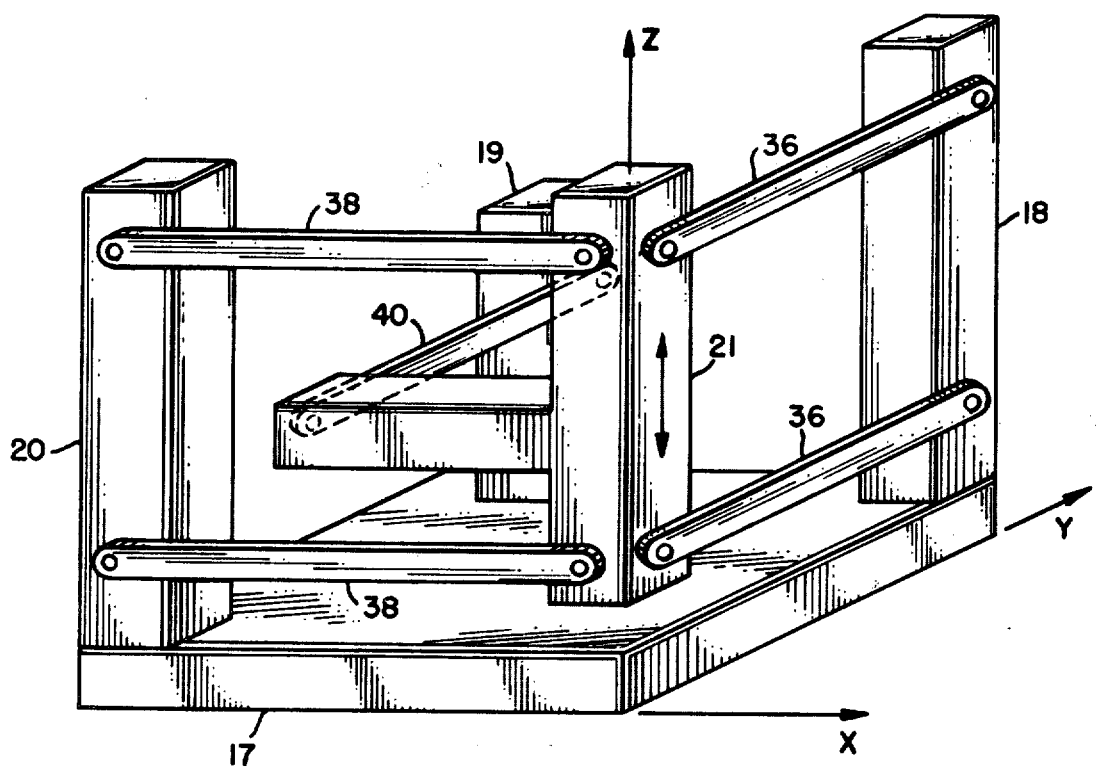
Fig_7

WEIGHING SCALE

This is a division of application Ser. No. 407,659, filed Oct. 18, 1973, now U.S. Pat. No. 3,847,238.

BACKGROUND OF THE INVENTION

The invention relates to weighing, and more particularly to an improved weighing scale which is well suited for use with a load cell of the type disclosed in U.S. Pat. No. 3,554,026, issued Jan. 12, 1971 in the name of Aniese E. Seed and with a digital readout for electronic weighing systems of the type disclosed in U.S. Pat. No. 3,709,309, issued Jan. 9, 1973 in the names of Roger B. Williams, Jr. et al.

It is a preferred embodiment of the invention to provide an improved weighing scale.

Another object is to provide improved parallel guidance mechanism for holding a weigh platter in a horizontal position while allowing it to move up and down.

Another object is to provide, in a weighing scale, means for adjusting parallelism of parallelogram check link structure which allows independent adjustment of shift errors.

Still another object is to provide, in a weighing scale, means for adjusting skewness of parallelogram check link structure in order to minimize such components of the shift error as will not respond to adjustment of parallelism alone.

Another object is to provide five check links so arranged in space that five of the six possible degrees of freedom of a weighing scale platter are constrained leaving the sixth degree of freedom for use in force measurement.

Other objects and advantages of the invention will become apparent from the following detailed description, with reference being made to the accompanying drawings.

BRIEF DESCRIPTION OF THE DRAWINGS

FIG. 2 is a fragmentary, elevational view of the scale shown in FIG. 1;

FIG. 3 is a view showing one of the check links shown in FIGS. 1 and 2;

FIG. 4 is a schematic view showing how the check link shown in FIG. 3 is tilted when adjusting parallelism of parallelogram check link structure according to the invention;

FIG. 5 is an enlarged, elevational view of a portion of the scale shown in FIG. 1;

FIG. 6 is a block diagram of an electronic weighing system with digital readout; and FIG. 7 is a schematic diagram illustrating the kinematic principle of the five-checklink concept.

DESCRIPTION OF THE PREFERRED EMBODIMENT

Figure 1:
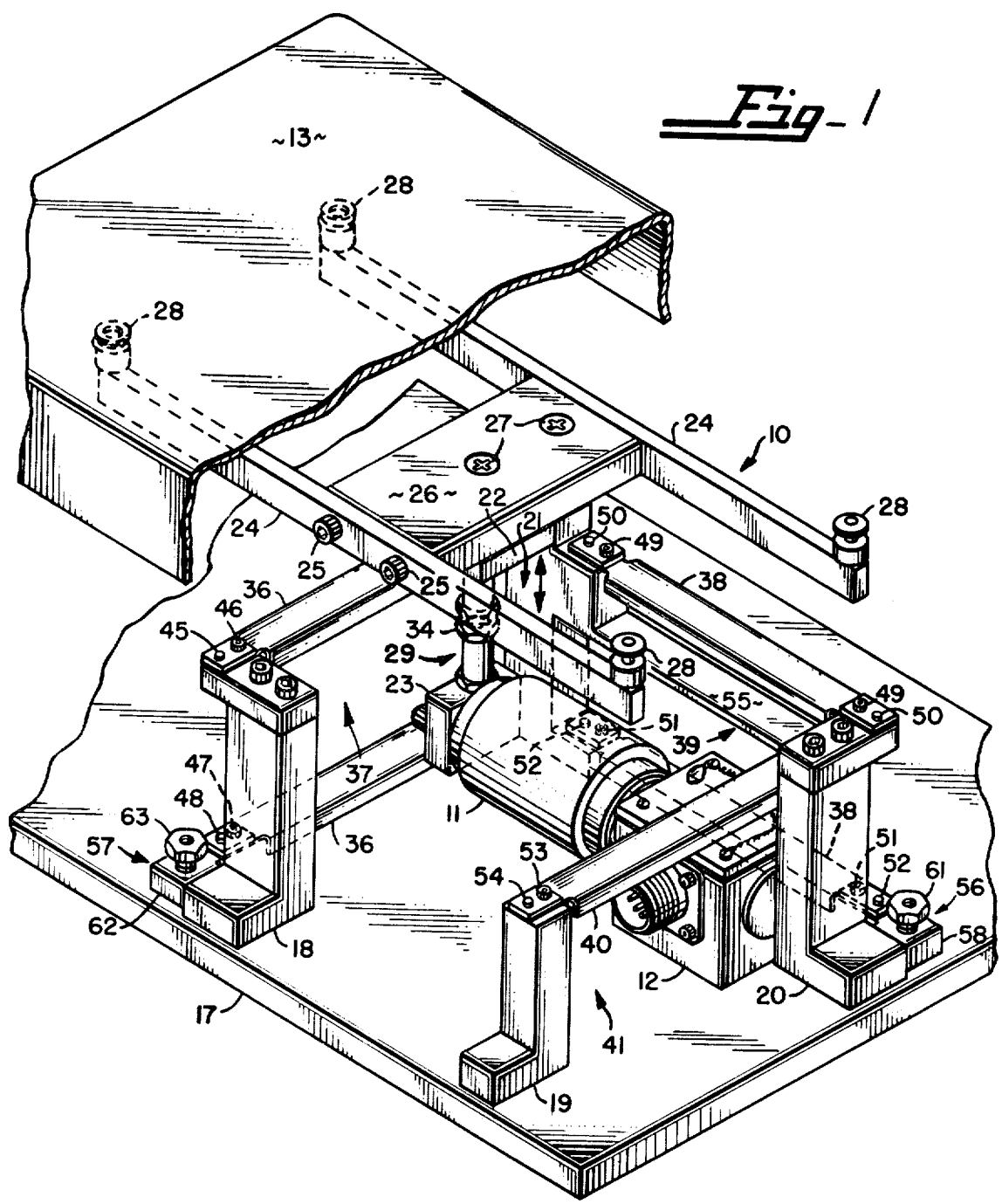
FIG. 1 is a perspective view of an improved weighing scale according to the invention.

Referring to FIG. 1, a weighing scale 10 embodying the principles of the present invention includes a transducer or load cell 11 which extends from a junction box 12. The load cell 11 establishes a direct current analog signal proportional to the unknown weight of an object being weighed upon a weigh platter 13. The load cell 11 is of the cantilever type disclosed in the foregoing U.S. Pat. No. 3,554,026 and employs impedance strain gages for determining an applied load in terms of strain induced by the load. A digital readout 14 (FIG. 6) indicates the weights in a digital format of loads placed upon the platter 13. The digital readout is disclosed in detail in the foregoing U.S. Pat. No. 3,709,309. In FIG. 2 of such U.S. Pat. No. 3,709,309, potentiometers (46 and 48 in the patent) set the output of the weighing system to zero when no load is applied to the load cell. Another variable resistor 49 in the patent is provided to adjust sensitivity, i.e., to achieve that the numerical amount indicated equals the numerical amount of weight or force applied to the load cell. The scale of the present invention employs similar means to adjust zero and sensitivity, symbolically represented by potentiometer knobs 15 and 15a which control the setting of zero and sensitivity, respectively. The zero of the weighing scale 10 of the present invention is set by turning a knob 15 which controls zero circuitry 16 of the readout 14.

The weighing scale 10 further includes a base plate 17 which supports the load cell 11, the junction box 12, and vertical frame means in the form of three stationary L-shaped posts 18, 19 and 20. A vertical load receiver 21 is mounted for movement parallel to the posts 18–20 and includes a load applying portion 22 spaced vertically from the end 23 of the load cell 11 remote from the junction box 12, i.e., spaced vertically from the load receiving end 23 of the centilever load cell. The force transducer 11 produces weight signals in accordance with force applied by the load receiver 21 which carries the platter 13 on spider arms 24. The arms 24 are connected to the load receiver 21 by means of screws 25 and a plate 26 secured to the top of the load receiver 21 by means of two screws 27. The screws 25 extend through the arms 24 and are threaded into the plate 26. Each end of the spider arms 24 carries a grooved member 28 the grooves of which receive clips not shown secured to the bottom of the platter 13 by means of which the platter is removably attached to the load receiver 21.

A strut 29 connects the load receiving end 23 of the load cell 11 and the load applying portion 22 of the load receiver 21. The strut 29 includes bearings 30 at its upper and lower ends and an adjustment screw 31 which joins an upper portion 32 and a lower portion 33 of the strut 29. The screw 31 is threaded into the strut portions 32 and 33 and when lock nuts 34 are loosened serves as means to vary the length of the strut 29. Either one or both of the strut portions 32 and 33 is or are turned on the screw 31 to change the length of the strut 29. Cone-pointed pivots 35 are carried one by the bottom of the load applying portion 22 of the load receiver 21 and the other atop the load receiving end 23 of the load cell 11 and are received by the bearings 30 to complete the connection.

Flexure or check link means connect the posts 18–20 and the load receiver 21 for movement of the load receiver in a substantially vertical path and includes two horizontal flexure links 36 forming with the post 18 and the load receiver 21 a parallelogram located in a first plane 37, two additional horizontal flexure links 38 forming with the post 20 and the load receiver 21 a parallelogram located in a second plane 39 which is substantially perpendicular to the first plane 37, and an additional flexure link 40 located in a third plane 41 which is substantially parallel to the first plane 37 and substantially perpendicular to the second plane 39. The ball bearing check link which is disclosed in U.S. Pat. No. 2,634,966 which issued Apr. 14, 1953 in the name of L. S. Williams can be used in place of the flexure links. It is not necessary that the foregoing geometry be used. The first 37 and second 39 planes can be at any angle to each other, but cannot be parallel to each other. The third plane 41, however, must be parallel to the first or second plane. One 36 of the five flexure links 36, 38 and 40 is shown in detail in FIG. 3; it includes a rigid part 42, flexure pivot portions 43, and defines four holes 44 for the reception of locating pins 45 and screws 46. Locating pin 45 and screw 46 are shown in FIG. 1 holding one end of the upper link 36 to the top of the post 18 and a second locating pin 45 and a second screw 46 are shown in FIG. 2 holding the other end of the upper link 36 to the load receiver 21. Screw 47 and pin 48 are shown in FIG. 1 holding one end of the lower link 36 to an adjustment device 57 and a second screw 47 and a second pin 48 are shown in FIG. 2 holding the other end of the lower link 36 to the load receiver 21. Screw 49 and pin 50 are shown in FIGS. 1 and 2 holding one end of the upper link 38 to the top of the post 20 and a second screw 49 and a second pin 50 are shown in FIGS. 1 and 2 holding the other end of the upper link 38 to the load receiver 21. Screw 51 and pin 52 hold one end of the lower link 38 to an adjustment device 56 and a second screw 51 and a second pin 52 hold the other end of the lower link 38 to the load receiver 21. Screw 53 and pin 54 are shown in FIG. 1 holding one end of the link 40 to the top of the post 19 and a second screw (not shown) and a second pin (not shown) similarly hold the other end of the link 40 to an extended arm 55 (FIGS. 1 and 2) of the load receiver 21. Accordingly, only vertical forces applied to the load receiver 21 are taken to the load cell 11. All other forces and couples are taken to ground.

The adjustment devices 56 and 57 are alike; the device 56 includes a horizontally disposed, elongated block 58 having one end anchored to the base plate 17 by means of a screw 59 and its other end located above the base plate 17 and mounted for vertical movement on a differential screw 61. The block 58 defines an inverted U-shaped notch 64 and a square-bottom opening 60 which serves as a pivot point. The pivot point or opening 60 is located under the center of the lower check link 38. Adjustment of the screw 61 causes the lower check link 38 to tilt about the pivot point 60. Adjustment device 57 includes a block 62 and a differential screw 63. The reactionary equal and opposite moments generated by rotating the adjustment device 57 are shown in FIG. 4. The adjustment device 56 functions to adjust parallelism of the check links 38 and the adjustment device 57 functions to adjust parallelism of the check links 36. No vertical reaction forces are generated as a result of an adjustment. This makes the adjustment of load shift errors as hereinafter described a simple procedure.

Adjustment of parallelism serves to correct what could be termed as the first degree or linear component of the shift error. This kind of error is present if equal increments are observed in the indication of the scale, e.g., for every inch that the test weight is being moved along any straight line across the weigh platter. Thus, prior to shift adjustment, the scale might indicate, e.g., 4.10 lbs., 4.14 lbs., and 4.18 lbs., respectively, when a test weight of 4.00 lbs. is placed successively on the left side, on the center, and on the right side of the platter. The five-checklink mechanism allows independent adjustment of shift errors for two perpendicular directions of load shift. Since as described above, no vertical reaction forces are generated as a result of an adjustment made by device 56 or 57, adjustment of load shift error is not accompanied by a change in the zero indication of the scale due to reactionary forces. The adjustment is made by placing a test weight of for example 4 pounds upon the center of the platter 13 and noting the weight indication on the readout 14. The readout, for example, might read 4.1 pounds. The test weight is moved from the center of the platter 13 first in one direction and then in the other parallel to the check link 38 and the adjustment screw 61 is turned each time the test weight is located in a new position until the readout 14 indicates 4.1 pounds, i.e., the 4 pound test weight according to the scale weighs 4.1 pounds in all positions. Then the test weight is moved from the center of the platter 13 first in one direction and then in the other parallel to the check links 36 and the adjustment screw 63 is turned each time the test weight is located in a new position until the readout 14 indicates 4.1 pounds, i.e., the 4 pound test weight according to the scale weighs 4.1 pounds in all positions. Then the scale is adjusted electrically, using adjustment means 15 and 15a, to display correct readout indications with no load and with a given test load applied.

As will be evident to those familiar with the theoretical concepts pertaining to flexure pivot mechanisms, the load shift error is not a linear function of the load displacement in the strict mathematical sense. The term "non-linear shift error" has been chosen to describe the case where the amount indicated for center loading does not equal the arithmetic average between the amounts indicated when test weight is placed on two opposite edges of the weigh platter. Thus, if a purely non-linear shift error is present, one might observe indications of, e.g. 10.011 lbs., 10.009 lbs., and 10.011 lbs., respectively, when a test weight of 10.000 lbs. is placed successively on the left side, on the center, and on the right side of the platter. The strut adjustment provided by the screw 31 is needed if moving the test weight as described above in connection with the use of adjustment devices 56 and 57, causes a nonlinear change in weight indication for linear changes in movement of the test weight upon the platter 13. For example, if a test weight of 10 pounds causes the readout 14 to indicate 10 pounds when the weight is upon the center of the platter 13, 10.1 pounds when the weight is moved from the center of the platter in one direction parallel to the check links 36, and 9.8 pounds when the weight is moved an equal distance from the center of the platter in the opposite direction parallel to the check links 36, the shift error is not linear. The strut adjustment provided by the adjustment screw 31 is made until the shift error in both perpendicular directions (shift of test weight parallel to check links 36 and 38) is as linear as possible. A compromise is necessary because adjustment for non-linear changes in one direction is not independent of changes in the other direction. The strut adjustment varies the distance between the load applying portion 22 of the load receiver 21 and the load receiving end 23 of the load cell 11. This also can be accomplished by placing shims under the load cell 11 or under the posts 18–20. With reference to the above example, the 10 pound test weight causes the readout 14 to indicate 10 pounds when the weight is upon the center of the platter 13 and 10.1 pounds and 9.8 pounds in the respective side positions.

The strut adjustment causes the weight indication relative to the zero setting to change. For example, after the adjustment is made, the test weight instead of being indicated as weighing 10 pounds at the center of the platter might be indicated as weighing 10.8 pounds. The test weight is moved parallel to the check links 36 and the strut adjustment is made until the shift error is linear. At one side of the platter, the weight then will be indicated as 10.95 pounds and at the other side as 10.65 pounds (at the center of the platter as 10.8 pounds, i.e., 0.15 pounds above 10.65 pounds and 0.15 pounds below 10.95 pounds—linear). The difference between 10.95 pounds and 10.65 pounds is 0.3 pounds and this is so because the difference between the above 10.1 pounds and 9.8 pounds before the strut adjustment was made was 0.3 pounds. The test weight in the example after the adjustment causes a weight indication of 10.8 pounds when located in the center of the platter, 10.95 pounds when moved from the center position parallel to the check links 36 to one side of the platter, 10.65 pounds when moved an equal distance parallel to the check links 36 to the other side of the platter, 10.95 pounds when moved from the center position parallel to the check links 38 to one side of the platter, and 10.65 pounds when moved an equal distance parallel to the check links 38 to the other side of the platter. Then adjustments are made as described above using screws 61 and 63 until the test weight causes a weight indication of 10.8 pounds in all positions upon the platter and then electrical adjustments are made, using adjustment means 15 and 15*a*, to display correct readout indications with no load and with a given test load applied.

The strut adjustment device 31 is a first adjustment means for making linear errors caused by moving loads through the center of the load receiving means parallel to the pivot means 36 and 38 to a plurality of other locations, the parallelism adjustment means 56 and 57 are second adjustment means for making said loads produce the same weight signals when located in said center of the load receiving means and in said other locations upon the load receiving means, and the electrical zero and sensitivity adjustment means 15 and 15*a* are third adjustment means operable after the adjustments provided by the first and second adjustment means are made to adjust the scale's zero setting and sensitivity.

With reference to FIG. 7, the check links 36, 38 and 40 are shown schematically to illustrate the kinematic principle of the five-checklink concept. The movable load receiver 21 has one degree of freedom as indicated by the double ended arrow, i.e., translatory motion in the vertical direction. Five degrees of freedom are constrained by five reactionary forces exerted on the load receiver 21 by the five check links 36, 38 and 40. The mechanism comprises the base 17, the support columns 18, 19 and 20, the body 21 to be guided in translatory motion, and the five, two-force members 36, 38 and 40. Links 38 constrain the body 21 from motion in the X-direction and from rotation about the Y-axis. Links 36 constrain the body 21 from motion to the Y-direction and from rotation about the X-axis. Link 40 checks rotation about the Z-axis. Any body in space is displaceable along X, Y and Z axes and rotatable about the X, Y and Z axes. The five check links 36, 38 and 40 are so arranged in space that five of said six degrees of freedom are constrained leaving the sixth degree of freedom for use in force measurement.

It is to be understood that the above description is illustrative of this invention and that various modifications thereof can be utilized without departing from its spirit and scope.

Having described the invention, we claim:

1. A weighing scale comprising, in combination, stationary frame means, movable load receiving means, transducer means for producing weight signals in accordance with movement of the load receiving means, check link means connecting the frame and load receiving means for movement of the load receiving means in a substantially vertical path, the load receiving means having a load applying portion spaced vertically from the transducer means, and means for varying the vertical distance between the load applying portion and the transducer means for adjusting the linearity of errors caused by shifting loads upon the load receiving means.

2. A weighing scale comprising, in combination, stationary frame means, movable load receiving means parallel to the frame means, transducer means for producing weight signals in accordance with movement of the load receiving means, check link means connecting the frame and load receiving means for movement of the load receiving means in a substantially vertical path, the load receiving means having a load applying portion spaced vertically from the transducer means, means for varying the vertical distance between the load applying portion and the transducer means for adjusting the linearity of errors caused by shifting loads upon the load receiving means, and means for adjusting the check link means to cancel said linear errors.

3. A weighing scale comprising, in combination, stationary frame means, movable load receiving means, transducer means for producing weight signals in accordance with movement of the load receiving means, check link means connecting the frame and load receiving means for movement of the load receiving means in a substantially vertical path, first adjustment means for making linear the errors caused by moving loads through the center of the load receiving means parallel to the check link means to a plurality of other locations upon the load receiving means, and second adjustment means for making said loads produce the same weight signals when located in said center of the load receiving means and in said other locations upon the load receiving means.

4. A weighing scale comprising, in combination, stationary frame means, movable load receiving means, transducer means for producing weight signals in accordance with movement of the load receiving means, check link means connecting the frame and load receiving means for movement of the load receiving means in a substantially vertical path, first adjustment means for making linear the errors caused by moving loads through the center of the load receiving means parallel to the check link means to a plurality of other locations upon the load receiving means, second adjustment means for making said loads produce the same weight signals when located in said center of the load receiving means and in said other locations upon the load receiving means, the adjustment produced by said first adjustment means changing the zero setting of the scale and the adjustment produced by said second adjustment means not changing the zero setting of the scale, and third adjustment means operable after said two adjustments are made to make said zero setting.

* * * * *